Aug. 29, 1967     G. W. HULTGREN     3,338,458
ORNAMENTAL COVER FOR LIPSTICK DEVICES AND THE LIKE
Filed May 4, 1965     2 Sheets-Sheet 1
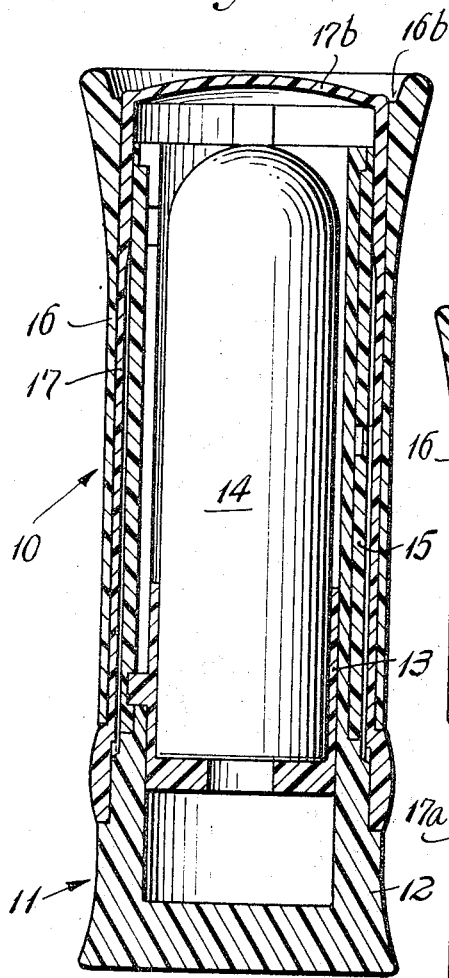
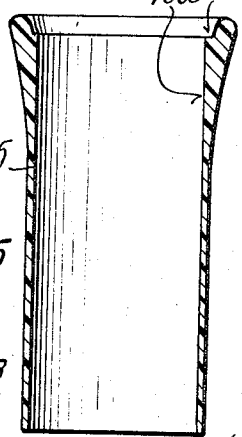
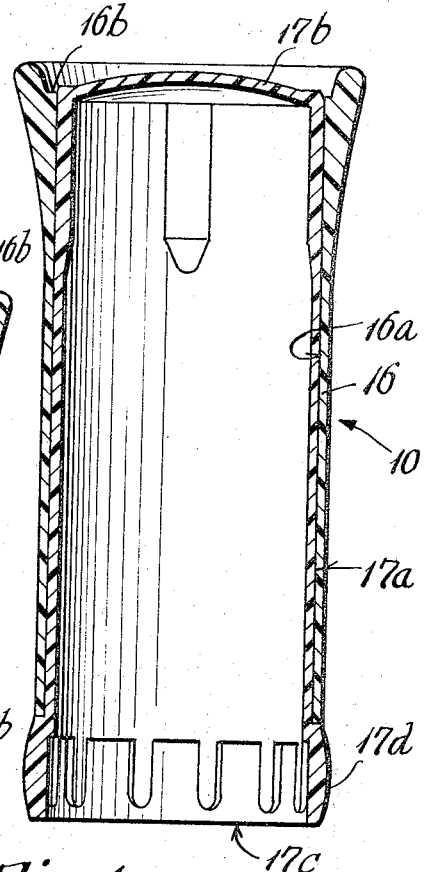
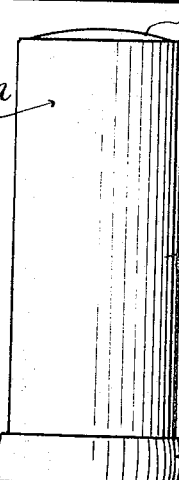
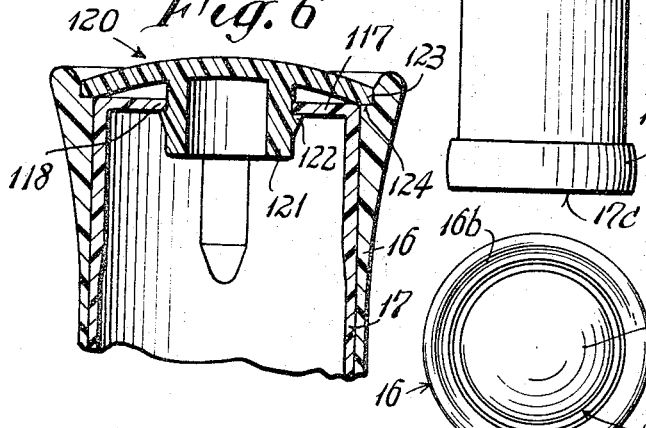
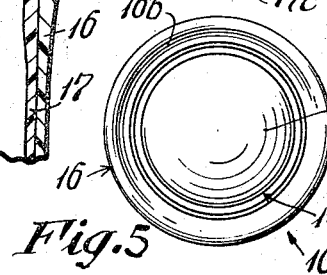
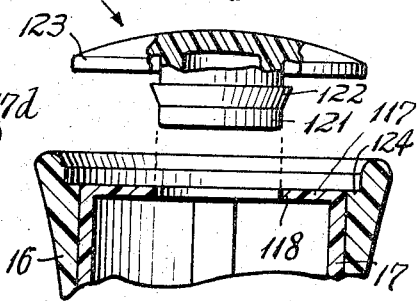
INVENTOR.
George W. Hultgren
BY
Johnson and Kline
ATTORNEYS Aug. 29, 1967  G. W. HULTGREN  3,338,458
ORNAMENTAL COVER FOR LIPSTICK DEVICES AND THE LIKE
Filed May 4, 1965  2 Sheets-Sheet 2
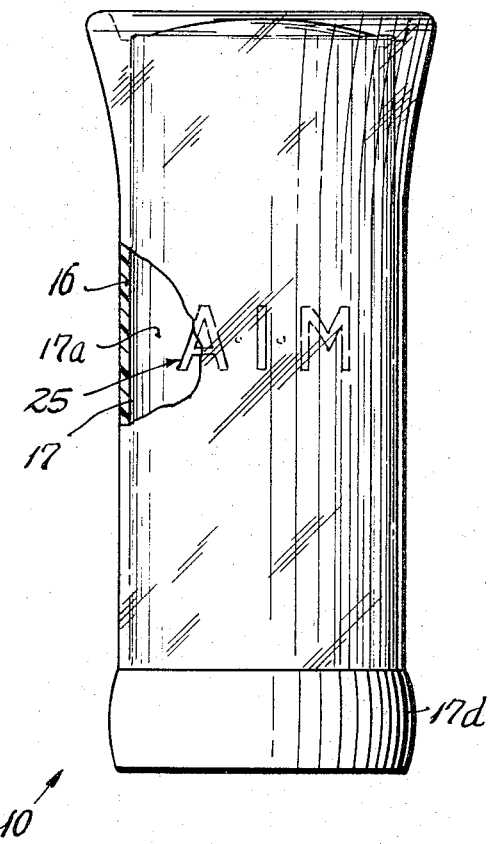
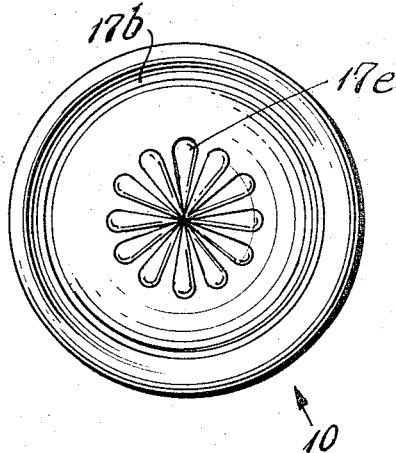
INVENTOR.
George W. Hultgren
BY
Johnson and Kline
ATTORNEYS

United States Patent Office 3,338,458
Patented Aug. 29, 1967

3,338,458
ORNAMENTAL COVER FOR LIPSTICK
DEVICES AND THE LIKE
George W. Hultgren, Fairfield, Conn., assignor to United
Tool & Plastics, Inc., Bridgeport, Conn., a corporation
of Connecticut
Filed May 4, 1965, Ser. No. 453,142
3 Claims. (Cl. 220—63)

The present invention relates to a novel ornamental cover for a lipstick, perfume vial or the like tubular device, and particularly to a multipiece cover formed of molded plastic material which may, by varying the components thereof, produce a large variety of ornamental and distinctive appearances for the device.

The present invention is an improvement on the cover device disclosed and claimed in my U.S. Patent No. 3,152,691. In this patent, the cover, which provides the major part of the exterior of the device when in position, is molded in one piece and, therefore, is restricted to the various exterior shapes and appearances that can be provided thereon for ornamental purposes.

The present invention overcomes this limitation of the ornamental appearance of the cover by providing a multipiece cover of molded plastic material, which pieces, when assembled and secured together, provide a large variety of appearances as may be desired to ornament the lipstick or the like device.

This is accomplished by molding inner and outer sleeves of plastic material, each of which is distinctive as to color or composition of the plastic material. The two sleeves are assembled in telescopic relation with at least a part of the inner sleeve exposed, thus providing a contrasting color combination or appearance as can be highly attractive. The sleeves can be bonded or heat sealed together or can be connected at their outer ends with a snap button which can be of molded plastic material and ornamented to enhance the appearance of the cover.

A feature of the invention resides in the fact that unlimited ornamental appearances of the cover can be obtained by the proper selection of the molding material and the assembly of the components.

Another feature of the invention resides in the fact that the components can be easily molded and assembled to provide an inexpensive cover.

A still further feature of the invention resides in the fact that the components can be molded in large quantities and by proper selection and assembly produce a large variety of ornamental appearances for the cover.

Other features and advantages of the invention will be apparent from the specification and claims when considered in connection with the accompanying drawings in which:

FIGURE 1 is a sectional view of the cover of the present invention applied to a lipstick device.

FIG. 2 is a sectional view of the cover.

FIG. 3 is a sectional view of the outer sleeve.

FIG. 4 is a side view of the inner sleeve.

FIG. 5 is a top view of the cover.

FIG. 6 is a sectional view of the upper end of the cover secured together by a snap button.

FIG. 7 is a view, partly in section, showing the button in position to be inserted to hold the two sleeve portions together.

FIG. 8 is a view of the cover disclosing a transparent outer sleeve.

FIG. 9 is a top view of the cover showing the outer end of the cover provided with ornamentation.

While the cover may be used in providing a closure for a vial of perfume, a chapstick or other similar tubular devices, it is herein illustrated as applied to a lipstick device. As shown in FIG. 1, a tubular cover 10 is positioned in telescopic relation over a lipstick device 11 comprising a body 12 having a carrier 13 movable therein and supporting a lipstick 14 and a sleeve 15 rotatable on the body for propelling the lipstick from the body as is known in the art. The cover, in the form of the invention shown in FIG. 1, is formed of two sleeves 16, 17. The outer sleeve 16, which has any desired outside configuration, is formed so as to have a bore 16a therethrough and be open at both ends, as shown in FIG. 3. The inner sleeve 17, in accordance with this form of the invention, is provided with an outer surface 17a to be received in the bore 16a and has a closed outer end 17b and an open inner end 17c provided with a projecting bead 17d extending therearound as shown in FIGS. 2 and 4.

In carrying out the invention, the two sleeves are molded from plastic materials of distinctive colors or composition and when assembled with the inner end of sleeve 16 abutting the bead 17d, as shown in FIG. 2, it will be apparent that portions of the inner sleeve will be exposed, i.e., the bead 17d and the closed end 17b. Where there is a color contrast between the two sleeves it will provide a very pleasing appearance. For example, the inner sleeve 17 can be molded of gold colored plastic and the outer sleeve 16 of a black plastic which will give a very attractive gold and black appearance when assembled.

While the closed end 17b of the inner sleeve can extend beyond the end of the outer sleeve 16, in the herein illustrated form of the invention it is positioned within a recess 16b formed at the outer end of the bore 16a of the outer sleeve and can be formed with embossing or other ornamentaiton 17e as shown in FIG. 9.

Although the bore 16a and the outer surface 17a of the sleeves are molded to have a very tight friction fit, it may be desired to further secure them together by a suitable cement or by heat sealing, since this method of securing the two sleeves together does not set up any strains or stresses in them as may be accomplished by deforming the bodies in assembled relation.

In the form of the invention shown in FIGS. 6 and 7, the two sleeves are formed as heretofore, with the exception that the inner sleeve 17 is provided at its outer end with an inwardly extending portion 117 forming an inwardly facing shoulder 118. A snap button 120, as shown in FIG. 7, is provided with a stud 121 having an outwardly facing shoulder 122 which, when inserted into the inner sleeve, will engage under the inwardly facing shoulder 118 thereon. A top 123 of the button extends outwardly to engage an outwardly facing shoulder 124 formed on the end of the outer sleeve 16 so that as the button is pushed into place, the material of the stud will be temporarily deformed as it passes through the end of the sleeve and the shoulder 122 will snap into position under the shoulder 118, with the overlying portion extending over the shoulder 124 of the outer sleeve and thus lock the two sleeves in a secure assembled relation.

While the snap button can be formed of metal, it is at present preferred to mold it from plastic material which can be of a color to contrast with the sleeves 16, 17 or can be transparent and the top of the button can be embossed or molded to have any desired ornamentation as was the top surface 17b in FIG. 9.

In some instances it may be desired to use a colored inner sleeve 17 and a transparent outer sleeve 16 and to print either the inner or outer sleeve or both sleeves with suitable indicia. For example, if the indicia be printed on the inner sleeve, it will be readily apparent through the transparent outer sleeve, or if printed on the outer sleeve the color of the inner sleeve will be apparent through the outer sleeve and form a background for the imprinting. While the indicia herein is illustrated in FIG. 8 as letters 25 printed on the surface of the inner sleeve, it is to be understood that any other design may be provided.

It will be seen, therefore, that by judicious selection of colors and the components, a wide variety of appearances can be effected. For example, the cover can be formed of two different colored plastics which will give a two-tone effect and the colors of the cover may also be distinctive from the molded body of the lipstick device, thus producing a three-tone appearance. Also, in the form of the invention shown in FIGS. 6 and 7, the button can be provided in a contrasting color or it can be transparent and can be provided with suitable ornamentation on its outer surface, such as a coat of arms or the like, so as to enhance the appearance of the cover. Then, too, by properly selecting the color of the inner sleeve and imprinting thereon suitable indicia and assembling it with a transparent outer sleeve, which may or may not have printing thereon, a wide variety of ornamental effects can be achieved.

In some instances it may be desired to view the lipstick within the lipstick device from the outside without removing the cover. This can be readily achieved by the present invention for, in situations where contamination of the lipstick is not a matter of concern, the button 120 can be eliminated and the viewing can occur through the opening in the outer end of the inner sleeve. However, in the preferred form of the invention the button 120 will be molded of a transparent plastic which will protect the lipstick from contamination and will permit a person to view the lipstick within the lipstick device without removing the cover so that the shade of lipstick or the type of lipstick can be readily determined.

Thus it will be seen that the multipart cover of the present invention which is formed of molded components which can be readily and inexpensively produced, provides, through the selection of proper color or composition of the plastic material and the assembly of the components, a vast number of ornamental combinations which produce many attractive ornamental appearances on the cover, in addition to surface configurations as may have been achieved by the cover of the prior patent above referred to, and thus the present invention is a substantial advance in the art over the same.

Variations and modifications may be made within the scope of the claims and portions of the improvements may be used without others.

I claim:

1. A multipart cover of plastic material for a lipstick or the like tubular device comprising an inner one piece sleeve of molded plastic material having a projecting solid bead at the inner end forming a shoulder and having an inwardly extending transverse wall at the outer end, an outer sleeve of molded plastic material having a bore to snugly receive said inner member and having both ends open, said sleeves being telescoped with the inner end of the outer sleeve engaging the shoulder of the projecting bead on the inner sleeve and the other end of the outer sleeve surrounding the inner sleeve and exposing said transverse wall, said transverse wall having a central aperture therein and the outer sleeve having a shoulder in the bore thereof adjacent the said wall, and a button overlying said wall and having a portion extending through said central aperture provided with means to interlock therewith and having a rim portion overlying said shoulder in the bore with said sleeves and button being secured together in assembled relation.

2. The invention as defined in claim 1 wherein the button is provided with ornamentation.

3. The invention as defined in claim 2 wherein the button is formed of transparent plastic material.

References Cited

UNITED STATES PATENTS

| 1,837,471 | 12/1931 | Neidich. | |
| 2,074,830 | 3/1937 | Conner | 215—43.1 |
| 2,329,375 | 9/1943 | Houlihan | 220—63 |
| 2,333,812 | 11/1943 | Nyden | 206—56 |
| 2,422,705 | 6/1947 | Saint Clair | 206—56 |
| 3,152,691 | 10/1964 | Hultgren | 206—56 |

THERON E. CONDON, *Primary Examiner.*

MARTHA L. RICE, *Examiner.*